Patented Sept. 9, 1952

2,610,201

UNITED STATES PATENT OFFICE 2,610,201

NONYL PHTHALATES

John T. Rutherford, Berkeley, Calif., assignor to California Research Corporation, San Francisco, Calif., a corporation of Delaware No Drawing. Application April 9, 1949, Serial No. 86,601

2 Claims. (Cl. 260—475)

This invention relates to novel alcohols having a formula of the type $$R\text{—}CH_2\text{—}OH$$

wherein R is an alkyl radical containing 8 carbon atoms and possessing a chain structure corresponding to that found in copolymers of n-butene-1 and n-butene-2, and to the process of preparing them. This invention also relates to novel and valuable plasticizer derivatives obtained from alcohols.

Higher alcohols are widely used today in the preparation of valuable ester plasticizing agents. Such wide use of higher alcohols contributes greatly to their scarcity. There is, consequently, a constant search for sources and means whereby greater quantities of more efficient higher alcohols may be obtained. For some time, now, the demand for higher alcohols has greatly exceeded the supply from natural sources and resort has been had to processes whereby these valuable alcohols might be prepared synthetically.

Perhaps the most recent development in the production of synthetic alcohols has been the application of the "OXO" reaction to olefinic hydrocarbons. The "OXO" reaction is that in which an olefinic hydrocarbon is carbonylated and hydrogenated by the addition of carbon monoxide and hydrogen to the olefin under proper temperature and pressure conditions in the presence of a catalyst. Alcohols of practically any desired molecular weight and structure may be prepared by this means.

The "OXO" reaction first appeared in an article published in the Journal of the American Chemical Society of August 1930 by Smith, Hawk and Golden. The authors were primarily interested in studying the mechanism of the then new Fischer-Tropsch synthesis of higher hydrocarbons from water gas and only noted that water-soluble, oxygen-containing compounds, such as alcohols and ketones, were formed as intermediates in the reaction. Since that time, the "OXO" reaction has been used to prepare several different types of alcohols by various processes, most of which are yet in the experimental stage.

The exact mechanism of the "OXO" reaction whereby alcohols are prepared from olefins is not fully known to the art as yet. However, for the purposes of this application, it may be considered merely as an addition of CO and H to the olefin so that the double bond becomes saturated and a —CH₂OH group is attached to one or the other of the carbon atoms adjacent to the double bond. During the reaction an aldehyde one carbon atom higher than the olefin is formed first. The aldehyde is then reduced by the hydrogen present to form the corresponding alcohol. A metal catalyst capable of forming a carbonyl structure, such as cobalt, nickel, and iron, is generally utilized in the reaction.

The "OXO" reaction may be performed in two stages. A first stage wherein the olefin is oxonated to form the corresponding "one carbon atom higher" aldehyde, and a second stage in which the aldehyde is reduced by hydrogenation to form the alcohol.

The "OXO" reaction may also proceed in a single stage fashion in which oxonation to aldehyde and hydrogenation to alcohol are allowed to occur at the same time, thus producing an alcohol from the olefin in one general reaction. Although either the two stage or the single stage reaction is suitable for the purposes of my invention, since they both yield the same general end product, it is the latter, single stage process, which has been utilized in making my invention.

The ideal hydrocarbon for the production of synthetic alcohols should be one of which there is a plentiful supply. It may be obtained from any of the sources now known, such as, destructive hydrogenation of coal; Fischer-Tropsch synthesis applied to water gas produced from coal or natural gas; petroleum refinery hydrocarbons and the like. Any other source by which unsaturated hydrocarbons of the desired type may be economically produced would also be satisfactory for the purpose of my invention.

Further, it has been determined that the alcohol produced should contain at least eight carbon atoms in order that the plasticizer derivative be not excessively volatile. Low volatility is especially desirable in plasticizing agents since it is the evaporation of the plasticizer and the attendant "drying out" of the plastic composition that contribute to its "aging" and loss of life or resiliency.

In addition, it has been found that, in the case of phthalate plasticizer derivatives, the flexibility efficiency of the ester in plastic compositions is greatest for alcohols having from seven to thirteen carbon atoms, and especially those containing from eight to ten carbon atoms. Generally speaking, though, hardness and flexibility efficiency characteristics of the various plasticizers are empirical in nature and incapable of prediction. Consequently, considerable research must be performed to find alcohols suitable for the production of desirable ester plasticizing agents. It was with this knowledge of the problem of finding an alcohol both economical and superior in properties that the investigations leading to my invention were conducted.

I have discovered new and distinct nonyl alcohols having a formula of the type

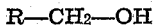

wherein R is an alkyl radical containing 8 carbon atoms and possessing a chain structure corresponding to that found in copolymers of n-butene-1 and n-butene-2. The method of preparing these novel alcohols is part of my discovery. These novel alcohols possess an entirely unexpected superiority in the field of alcohols suitable for the preparation of plasticizing agents.

I have also discovered novel dinonyl phthalates having a formula of the type

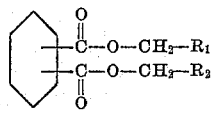

wherein $R_1$ and $R_2$ are alkyl radicals containing 8 carbon atoms and possessing a chain structure corresponding to that found in copolymers of n-butene-1 and n-butene-2. These phthalates are distinct and superior plasticizing agents.

The first step in producing my novel nonyl alcohols is the preparation of copolymers of n-butene-1 and n-butene-2. Both n-butene-1 and n-butene-2 are available in good supply in modern petroleum refinery operation. The copolymerization may be accomplished by any of the means already known to the art. The copolymer used in making this invention was prepared by polymerizing a synthetic gas mixture of pure hydrocarbons containing substantial proportions of n-butene-1 and n-butene-2. This gas mixture should be substantially free of isobutene. The polymerization reaction was carried out under pressure and at an elevated temperature in the presence of a phosphoric acid catalyst. The product was then stabilized, filtered and fractionated to obtain an octene cut.

The proportions of n-butene-1 and n-butene-2 suitable for the purposes of my invention may be any of those generally found in equilibrium mixtures of the two hydrocarbons. In the presence of an acid catalyst an isomerization reaction usually occurs in which an excess of n-butene-1 over the equilibrium proportion for the particular reaction temperature is isomerized to form n-butene-2 and to reach the equilibrium for that temperature. These equilibrium proportions for n-butene-1 in a mixture of n-butene-1 and n-butene-2 in the presence of an acid catalyst generally range from about 5% at room temperature of 25° C. to about 60% at a temperature of around 1200° C. A more practical and common range of proportions of n-butene-1 in equilibrium mixtures of n-butene-1 and n-butene-2 would be from about 20% to 40%.

Since it is the chain structure of this copolymer which undoubtedly contributes the novel and unexpected properties to my "OXO" nonyl alcohol, a thorough analysis of its physical characteristics was made. The copolymer was found generally to possess a boiling range of about 100° to 125° C., a bromine number of about 150, and a refractive index of the order of 1.416.

The desired nonyl alcohol mixture is then prepared from the above n-butene-1 and n-butene-2 copolymer type of hydrocarbon by the addition of carbon monoxide and hydrogen thereto. In general, a pressure of from about 2,500 to about 5,000 pounds per square inch is maintained with the carbon monoxide and hydrogen present in the form of a mixture in which the carbon monoxide represents from about 40% to 70% and the balance is hydrogen and inert gases. The reaction is conducted at a temperature of about 300 to 400° F., preferably 340 to 380° F. in the presence of a catalyst of the cobalt, iron or nickel type. It is known that the reaction will proceed under other conditions and proportions, but those set forth are ordinarily used. After the reaction is completed, the catalyst is withdrawn from the mixture and sodium hydroxide added to convert any aldehydes formed to higher boiling materials. The caustic is then drawn off, the crude product water-washed and fractionated to give the desired nonyl alcohol cut boiling between about 120° and 130° C. at 50 mm. pressure.

The novel phthalate derivative of the above "OXO" nonyl alcohol is next prepared by reacting it with a phthalic acid reagent in the presence of a catalyst such as p-toluene sulfonic acid monohydrate. The phthalic acid reagent may be any of the isomers of phthalic acid or its anhydride. Although my esterification was performed in an atmosphere of carbon dioxide or nitrogen at a temperature of from about 300° F. to 360° F., any other inert gas and reaction temperature within the knowledge of a person skilled in the art may be used.

The above di-nonyl phthalate was found to have unexpectedly desirable qualities as a plasticizing agent when tested with a vinyl chloride polymer type of resin. It was superior in practically every respect tested to phthalates derived from "OXO" alcohols produced using other readily available petroleum refinery hydrocarbons.

In preparing these novel nonyl alcohols and their phthalate derivatives, the following examples illustrate more explicitly the type of procedure followed:

EXAMPLE 1

*Preparation of n-butene-1 and n-butene-2 copolymer*

A synthetic liquefied gas mixture was prepared having the following composition:

| | Per cent by weight |
|---|---|
| Ethylene | 0.2 |
| Propylenes | 0.2 |
| n-Butane | 56.9 |
| iso-Butane | 1.8 |
| n-Butene-1 | 13.5 |
| n-Butene-2 | 26.1 |
| Butadiene | 1.3 |
| Total | 100.0 |

4,530 ml. of the above liquefied gas mixture was pumped through a bed of catalyst composed of Fuller's earth pellets saturated with 70% phosphoric acid. The liquid was fed at a rate of 2.6 liters per hour per liter of catalyst. A catalyst temperature of 250° C. and a pressure of 250 pounds per square inch were maintained. The product containing polymers and unreacted hydrocarbons was stabilized, filtered and fractionally distilled to obtain an octane cut having the following analysis:

| | |
|---|---|
| Boiling range | 100° to 125° C. |
| Bromine No | 149 |
| Density (20/20) | 0.728 gms. per ml. |
| Refractive index (20/D) | 1.416 |

EXAMPLE 2

*Preparation of nonyl alcohol from n-butene-1 and n-butene-2 copolymer*

380 gms. of n-butene-1 and n-butene-2 copolymer prepared as in Example 1, above, was charged to a stainless steel autoclave with 80 gms. of catalyst comprising 57 gms. of water and 23 gms. of cobaltous acetate tetrahydrate. The autoclave was purged twice and then pressured to 2,000 pounds per square inch with carbon monoxide and hydrogen in a volume ratio of 1:1. The mixture was agitated and heated to a temperature of 380 to 400° F. where the reaction began. When the reaction commenced, a pressure drop occurred due to gas being taken up by the olefin. Beginning at this point, carbon monoxide and hydrogen gas in the ratio of 1:1 were added to maintain a pressure of from 3,000 to 3,500 pounds per square inch until the reaction was completed as evidenced by no more gas being taken up. The autoclave was then dumped and the crude alcohol weighed. A sample run follows:

| | |
|---|---|
| Time of run | 3½ hrs. |
| Density of crude | 0.84 |
| CO No. of crude | 24.4 |

The crude alcohol was then washed in a stirred vessel with about 20 per cent by volume of water at a temperature of 200° F. for one hour to remove the cobalt catalyst. The water layer was drawn off and the crude next stirred with 25 per cent by volume of caustic (25 per cent NaOH) at 200° F. for two hours to condense any aldehydes present to higher boiling materials. The caustic was then drawn off, the crude water-washed and distilled to give an alcohol cut boiling in the range of 120 to 130° C. at 50 mm. pressure. Such a cut has the following characteristics.

| | |
|---|---|
| OH No | 385 |
| CO No | 15.9 |
| Refractive index (M 20/D) | 1.4379 |
| Density (20/4) | 0.8407 |

The yield of alcohol was 54 per cent by volume of the crude reaction mixture charged to the still.

EXAMPLE 3

*Preparation of di-nonyl phthalate from n-butene-1 and n-butene-2 copolymer alcohol*

292 gms., or two mols, of the above "OXO" nonyl alcohol, and 126 gms., or 0.85 mol, of phthalic anhydride along with 1.9 gms., or 0.01 mol, of p-toluene sulfonic as catalyst were charged to a stirred vessel equipped with an overhead trap and thermometer well. An inert atmosphere of carbon dioxide was maintained. After one-half hour of stirring, the mixture was heated and brought to reflux. The reaction was complete in about one hour's time as indicated from the calculated amount of water obtained in the overhead trap. The temperature rose from 304° F., when the water first began to come off, to 362° F. at completion time. The crude ester product was next removed and washed with dilute caustic followed by hot water to remove the catalyst. An ester cut was obained by distillation of the crude ester at reduced pressure. The ester cut obtained was then clay-treated to reduce the neutralization number. The ester cut derived has the following analysis:

| | |
|---|---|
| Boiling range | 187–210° C. at 0.2–0.3 mm. |
| Saponification No | 278 |
| Neutralization No | 0.07 |
| Refractive index (M 20/D) | 1.4875 |
| Density (20/20) | 0.9871 |
| Viscosity at 100° F., SSU | 190.4 |
| Viscosity at 210° F., SSU | 43.8 |
| Viscosity index (Dean and Davis) | 56 |

The over-all yield of the ester based on the phthalic anhydride charged was about 95 per cent of theory.

In order to illustrate the superior properties of the "OXO" nonyl alcohol of my invention and the novel phthalate plasticizing agent prepared from it, a series of tests were performed using the following procedure.

A proper evaluation of the phthalate plasticizer derivative of my novel alcohol requires a comparison with the phthalate derivatives of other alcohols of the same general class. For this comparison, a di-nonyl orthophthalate derived from nonyl alcohols produced by the "OXO" reaction on di-isobutylene polymers was selected. Di-isobutylene polymers are comparable to the copolymer of n-butene-1 and n-butene-2 used in my invention in that they are readily available from among petroleum refinery hydrocarbons of today. Because of their availability, and the accompanying economies, nonyl alcohols from di-isobutylene are of current interest in the plasticizer art.

The tests were conducted by mixing 35 to 40 per cent of each of the above individual plasticizers with Geon 100×20 paste resin, a polyvinyl chloride resin product of the B. F. Goodrich Chemical Co., Cleveland, Ohio. This mixture was pressed between heated platens for about five minutes to form a clear homogeneous test sheet.

The volatility of each plasticizer was measured by cutting duplicate strips from each pressed sheet, one inch by three inches in size. They were marked, weighed and placed in an oven at 105° C. for two consecutive twenty-four hour periods. The loss in weight sustained during each period was taken as a loss of plasticizer and is expressed in percentage loss of total starting plasticizer in the table following.

The hardness characteristics for each of the plasticizing agents were determined by means of a Rex Model A hardness tester at a temperature of 75° F. as described in A. S. T. M. method D676–44T. The sample on which the test was performed was made from the pressed plastic sheets described above and had a thickness of about 0.16 inch. The measurements of the test were obtained in Shore hardness units as set out in the table below.

The flexibility characteristics were determined by the method of R. F. Clash, Jr. and R. M. Berg described in their article in Industrial and Engineering Chemistry, vol. 34 (1942), pages 1218–22. In this test, the temperature is recorded at which a sample of the plasticizer containing plastic will twist 200° in a 5-second period. The test sample is 2.50 x 0.25 x 0.040 inches in dimension and has mounting holes centered 2 inches apart. Any deviation in thickness of the sample from the standard 0.040 inch is corrected to the standard thickness according to Figure 9 of the article by Clash and Berg. The final value, $T_f$, for the temperature of flex in degrees centigrade is recorded for each of the plasticizers noted in the table following.

The efficiency of my novel plasticizing agent compared to that produced from di-isobutylene was next determined, both as to hardness and as to flexibility. This efficiency was calculated on a per cent basis as a measure of the effectiveness of my plasticizer compared to di-nonyl phthalate derived from di-isobutylene which was taken as the standard because of its acceptance in the plasticizer art. The hardness and flex temperature, $T_f$, of di-nonyl phthalate from di-isobutylene was given a value of 100 per cent.

To calculate the efficiency of a plasticizer having, for example, a flex temperature, $T_f$, of $-17°$ C. for a sample containing 40 per cent plasticizer, the concentration of the standard di-nonyl phthalate derived from di-isobutylene to give that flex temperature is determined. Say it is found to be 37.7%. The $T_f$ efficiency of the plasticizer tested is then 37.7×100/40 or 94 per cent. Hardness efficiency is calculated by the same method.

The characteristics of the orthophthalate derivatives of the two "OXO" nonyl alcohols tested, namely, those produced from di-isobutylene and those prepared from a copolymer of n-butene-1 and n-butene-2 according to my invention are set forth in the following table.

TABLE I

*Orthophthalate plasticizers in polyvinyl chloride resin*

| Description of Ester | Source of Olefin | Volatility Percent Ester Loss in 24 hrs. at 105° C. | Efficiency | |
|---|---|---|---|---|
| | | | Hardness Per cent at 75° F. | Flex, Per cent Low Temp. |
| Di-nonyl | Di-isobutylene | 9.5 | 100 | 100 |
| Do | 1-2 Butene Copolymer | 2.9 | 105 | 107 |

As may be readily observed from the above table, the nonyl alcohol of my invention, produced from a copolymer of n-butene-1 and n-butene-2 by the "OXO" process, is superior in practically every respect as to its ability to form the most desirable phthalate plasticizing agent.

The "OXO" nonyl alcohol of my invention produced from n-butene-1 and n-butene-2 copolymer is shown in the table above to have a volatility loss of plasticizer of only 2.9%. This is less than one-third of the loss sustained in the use of "OXO" nonyl alcohol derived from di-isobutylene. In both hardness and flex efficiency my "OXO" nonyl alcohol rates at or above 105, compared to the di-isobutylene "OXO" alcohol assigned efficiency of 100. Such a decided superiority is not capable of prediction since both alcohols are produced in the same manner, have the same molecular weight and differ only slightly in structure.

The "OXO" nonyl alcohol of my invention, produced from n-butene-1 and n-butene-2 copolymer, is superior in all respects to "OXO" nonyl alcohol from di-isobutylene except, possibly, as to relative economy. In that one instance they would probably be about equal. However, any possible analysis of the individual characteristics of the two "OXO" alcohols as set out in the above table would lead a worker skilled in the art to one obvious conclusion. That is, the "OXO" nonyl alcohols of my invention are not merely "different" alcohols falling within the general class of $C_7$ to $C_{13}$ alcohols suitable for the formation of plasticizer derivatives. They are, rather, novel and distinctly superior in view of their unexpected ability to produce such highly desirable plasticizing agents.

A sample of the di-nonyl phthalate plasticizer of my invention was compared to di-octyl phthalate which is currently accepted as one of the best plasticizers in the plastics industry today. The volatility characteristics as compared in the following table of results were found to be particularly interesting.

TABLE II

*Volatility of plasticizer in polyvinyl chloride resin*

| Ester | Alcohol | Source of Alcohol | Percent Ester Loss 24 hrs. at 105° C. |
|---|---|---|---|
| Di-octyl phthalate | 2-ethyl hexanol | Aldehyde Condensation | 12.7 |
| Di-nonyl phthalate | Nonyl "OXO" alcohol | "oxonation" of n-butene-1, n-butene-2 copolymer | 2.9 |

The "OXO" nonyl alcohol of my invention is found to be superior even to the 2-ethyl hexyl alcohol used in the di-octyl phthalate since it produces a plasticizer having less tendency to volatilize from the plastic. Reference to Table II shows that the loss of di-nonyl phthalate plasticizer of my invention was less than one-fourth the loss of the currently accepted di-octyl phthalate in similar compositions. This single characteristic is of the utmost importance since it relates directly to the ability of the plastic to withstand the effects of aging as previously pointed out. Furthermore, the "OXO" nonyl alcohol of my invention is far superior from the standpoint of economy since it may be produced synthetically from petroleum refinery sources in far greater quantities than corresponding types of alcohols from other sources.

In view of the foregoing disclosure, variations and modifications of the invention may become apparent to one skilled in the art. This invention contemplates all such variations and modifications as coming within the scope of the appended claims.

I claim:

1. Di-nonyl phthalate mixtures having a formula of the type

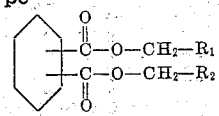

wherein $R_1$ and $R_2$ are alkyl radicals containing 8 carbon atoms and possessing chain structure found in copolymer mixtures of n-butene-1 and n-butene-2.

2. Di-nonyl ortho-phthalate mixtures having a formula of the type

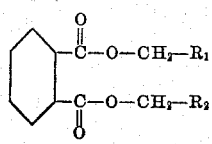

wherein $R_1$ and $R_2$ are alkyl radicals containing 8 carbon atoms and possessing chain structure found in copolymer mixtures of n-butene-1 and n-butene-2.

JOHN T. RUTHERFORD.

REFERENCES CITED

The following references are of record in the file of this patent:

UNITED STATES PATENTS

| Number | Name | Date |
|---|---|---|
| 1,815,878 | Schaack | July 21, 1931 |
| 1,993,736 | Graves | Mar. 12, 1935 |
| 2,015,077 | Lawson | Sept. 24, 1935 |
| 2,015,088 | Reid | Sept. 24, 1935 |
| 2,181,640 | Deansly | Nov. 28, 1939 |
| 2,327,066 | Rollen | Aug. 7, 1943 |
| 2,464,916 | Adams | Mar. 22, 1949 |
| 2,486,693 | Spijker | Nov. 1, 1949 |
| 2,517,351 | Reid | Aug. 1, 1950 |

FOREIGN PATENTS

| Number | Country | Date |
|---|---|---|
| 873,391 | France | July 7, 1942 |

OTHER REFERENCES

Technical Oil Mission Microfilm Reel 14, Frames 00000637–649; Reel 1, Frames 49–55; Reel 14, Frames 668–673 (1942) Declassified Oct. 15, 1945.